Patented June 10, 1947

2,422,089

UNITED STATES PATENT OFFICE 2,422,089

MANUFACTURE OF CHLORINATED QUINONES

Harry H. Fletcher, Nutley, N. J., assignor to United States Rubber Company, New York, N. Y., a corporation of New Jersey No Drawing. Application July 13, 1944,
Serial No. 544,821

5 Claims. (Cl. 260—396)

This invention relates to the production of chlorinated quinones from amino-substituted benzenes and naphthalenes.

An object of the invention is to provide improved processes of converting primary and secondary amino-derivatives of benzene, and primary and secondary alpha-amino-derivatives of naphthalene, directly to chlorinated quinones by the action of elemental chlorine, with economy of materials and/or increased yields of the final products, especially chloranil (from the amino benzenes) and 2,3-dichloronaphthoquinone-1,4 (from the alpha-aminonaphthalenes), and homologs and analogs thereof. Other objects will be apparent from the following detailed description.

Broadly, the invention comprises passing gaseous halogen (chlorine) into a liquid medium containing sulfuric acid (which may range from a highly diluted state to a highly concentrated state) and the said amino-derivative. Where the acid is used in highly concentrated form, it has been found that the purity of the final product is enhanced if a saturated fatty acid containing from one to four carbon atoms is also present with the sulfuric acid. The fatty acid is of decreasing effectiveness where it contains above four carbon atoms. The concentration of the sulfuric acid may also vary in accordance with the nature of the aromatic compound, that is, whether it is an amino-benzene compound, or an amino-naphthalene compound.

The starting aromatic compounds are represented by the formulae

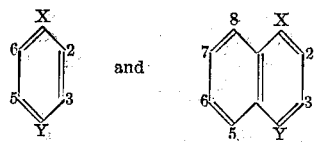

in which X is chosen from the groups —NH$_2$, —NH-alkyl, and —NH·CO·alkyl; Y is chosen from the groups —H, —OM, —SO$_3$M (where M is hydrogen or metal), —NH$_2$, —NH-alkyl, —NH—CO-alkyl, —NO, —NO$_2$, —Cl, —O-alkyl, —CO-alkyl, —N=N-aryl, and —COOH; and wherein the 2, 3, 5, 6, 7, and 8 positions are occupied by any of the radicals hydrogen, chlorine, and alkyl.

In dealing with a reaction solvent of aqueous sulfuric acid, for the amino-benzene reagents, the sulfuric acid concentration may range by weight from 40 to 85%. A preferred mixture consists of about 70 parts of sulfuric acid (96%) and 30 parts of water. Where the reaction solvent comprises sulfuric and acetic acids the concentration of the acetic acid is between 45 and 75%, the remainder being sulfuric acid of 96% concentration. A preferred mixture consists of about equal parts of sulfuric acid (96%) and acetic acid (glacial). If desired, the mixture may be diluted with an equal weight of water. Substantial yields are also obtainable when the concentration of acetic acid is as low as 25%.

In dealing with a reaction solvent of aqueous sulfuric acid for the amino-naphthalene reagent, the sulfuric acid concentration may range from 40 to 60% for best yield and purity, but can be within the range of 25 to 70% by weight. A preferred mixture consists of about equal parts of sulfuric acid (96%) and water. Where the reaction solvent comprises sulfuric and acetic acids, each 100 parts of the solvent may contain from 5 to 50 parts of sulfuric acid (96%), from 50 to 95 parts of acetic acid, and from 0 to 45 parts of water. The addition of water improves the purity of the product somewhat.

The temperature of the reaction mixture is preferably kept between 80° and 120° C., although the desired products may also be obtained in somewhat lower yield and lower purity at temperatures between 40° and 80° C., and at temperatures above 120° C. Below 80° C. the reaction is rather slow and below 40° C. it does not go to completion in any practical length of time. Above 120° C. the product is darker and less pure, probably because of incipient charring by the sulfuric acid, but temperatures up to the boiling points of the solutions at atmospheric pressure may be used. (A mixture of 50 parts of acetic acid and 50 parts of sulfuric acid boils at about 135° C.; 70% aqueous sulfuric acid boils at about 160° C.).

When carrying out my process for making halogenated naphthoquinones it is advisable, although not essential, to carry out the first stage of the reaction between the amino-naphthalene and the chlorine without external heating, or even with cooling to room temperature, until the first exothermic reaction subsides, then to continue the reaction with more chlorine at an elevated temperature, preferably between 80° C. and 120° C. This stepwise temperature increase usually improves the yield and purity of the desired product.

Instead of the acid mixtures specified above, I may use the filtrate remaining after removal of the desired product. Any of the known chlorination catalysts, e. g., iron, antimony, manganese, chromium, or compounds containing these elements, may be used, although the reaction proceeds smoothly even in their absence.

In order to decrease the time required to complete the chlorination, it is desirable to pass the chlorine into the reaction mixture at a rate somewhat in excess of that at which it will be absorbed by the amino-substituted benzene or naphthalene compound, particularly in the later stages of the chlorination. In large scale practice this procedure may result in the loss of chlorine. Therefore, I advantageously pass the exit gases containing such excess chlorine into an auxiliary reactor having therein a fresh charge of the amino-substituted compound and acid, whereby such excess chlorine is absorbed and thus recovered. When the chlorination in the first reactor has been completed, the mixture is discharged and replaced with a fresh charge of amine. Fresh chlorine is then passed into the partially chlorinated material in the second reactor until the reaction is finished, while the exit gases containing the excess of chlorine are passed into the fresh charge of amine in the first reactor.

The following examples illustrate my process:

Example 1

A mixture consisting of 46.5 grams (0.5 mol) of aniline, 300 grams of acetic acid, and 300 grams of 96% sulfuric acid is treated with chlorine substantially at atmospheric pressure with stirring at such a rate that unreacted chlorine is present in the exit gases, the mixture being heated under a reflux condenser to 105–115° C. The inflow of chlorine is continued at this temperature until the reaction is substantially complete, about 6–15 hours being required, depending on the efficiency of stirring. As the reaction proceeds, a finely divided solid appears. The color of the solution gradually changes from reddish brown to deep blue to yellow or tan, the latter color indicating that chlorination may be stopped. The cooled mixture is filtered and washed well with water. The yield of air dried chloranil has ranged from 105 to 117 gm. (85–95% of theory) in various runs by this method; M. P. 293–295° C. (sealed tube). (All melting points are corrected for exposed stem.)

Example 2

A charge of 46.5 grams (0.5 mole) of aniline in 600 grams of 70% aqueous sulfuric acid is treated with chlorine for 8 hours at 110° C. When 202 grams of chlorine has reacted, the mass is cooled and filtered. A yield of 112 grams, or 91% of theory, of chloranil melting at 289–294° C. is obtained.

Example 3

A charge of 46.5 grams (0.5 mole) of aniline in 600 grams of 50% aqueous sulfuric acid is chlorinated for 12 hours at 110° C. When 210 grams of chlorine has reacted the mass is cooled and filtered. A yield of 103 grams, or 84% of theory, of chloranil melting at 293–296° C. is obtained.

Example 4

A mixture of 29.5 grams (0.28 mole) of o-toluidine, 300 grams sulfuric acid, and 300 grams acetic acid is treated with chlorine in the manner specified in Example 1. A yield of 54 grams, or 86% of theory, of 3,5,6-trichloro-2-methyl benzoquinone melting at 236° C. with slight decomposition is obtained. It may be recrystallized from benzene to yield the bright yellow product melting at 241–242° C.

Example 5

A mixture of 40 grams (0.17 mol) of naphthionic acid (containing ½H$_2$O of crystallization), 400 grams of 50% aqueous sulfuric acid and 2 grams iron powder is treated with chlorine for 7.5 hours at 80° C. with stirring. The mixture is diluted with water after cooling, filtered, and washed first with water and then with alcohol. The yield of the crude air dried 2,3-dichloro-1,4-naphthoquinone is 30.5 grams, or 78% of theory, of a light yellow powder, melting at 177–186° C. The melting point may be raised to 196.0–196.5° C. by recrystallizing from acetic acid, acetone, or benzene.

Example 6

The same reagents used in Example 5 are treated with chlorine for 3 hours at room temperature, and then for 4 hours more at 90° C. with stirring. The crude product is worked up as in Example 5. The yield of the yellow dichloronaphthoquinone is 34 grams, or 87% of theory, melting at 174–183° C. The melting point may be raised to 197.0–197.5° C. by recrystallization.

Example 7

A mixture of 557 grams (1.7 mol) of sodium naphthionate (assaying 76%, the rest being water) and 4 kg. of 50% aqueous sulfuric acid containing 85 grams FeSO$_4$·7H$_2$O is treated with chlorine for 4 hours at room temperature with stirring, during which time an additional 278 grams (0.85 mol) of sodium naphthionate is added gradually to the solution. During the next two hours the temperature is raised to 80° C. and then held at that temperature for 5 hours. Finally the temperature is raised to 90–95° C. and held at that temperature for 13 hours. Throughout all this time chlorine is added with stirring. The crude dichloronaphthoquinone is worked up as in Example 5. The yield is 456 grams, or 77.5% of theory, of a yellowish tan powder, melting at 187–191° C. without recrystallization.

Example 8

A mixture of 69.6 grams (0.3 mol) of naphthionic acid, 12 grams of water, 213 grams of acetic acid, and 75 grams of 96% sulfuric acid is treated with chlorine with stirring for about an hour with the container immersed in an ice bath. The inflow of chlorine is then continued for 5 hours while the mixture is heated at 90–100° C. The bright yellow product is worked up as in Example 5. The yield of air dried 2,3-dichloro-1,4-naphthoquinone is 57 grams, or 84% of theory, melting at 193–195° C. without recrystallization.

Example 9

A mixture of 9.3 grams (0.1 mol) of aniline, 300 grams of ice, 150 grams of sulfuric acid, and 150 grams of acetic acid is treated with chlorine at room temperature for an hour with stirring. The mixture is then kept at the boiling point during 6 hours additional treatment with chlorine. After cooling the mixture, the glistening platelets of chloranil are filtered and washed with water. The yield is 18.9 grams, or 76.8% of theory, of chloranil melting at 293–295° C.

Example 10

Aniline is converted by chlorine to chloranil in a mixture of equal weights of propionic acid and sulfuric acid in a manner similar to Example 1. A yield of 74% of theory of chloranil melting at 290° C. is obtained.

In place of acetic or propionic acid, formic or butyric acid may be used.

Chloranil can be made by my process from aniline, N-methylaniline, N-ethylaniline, acetanilide, p-aminobenzoic acid, p-anisidine, p-phenetidine, p-aminoacetophenone, p-phenylenediamine, p-aminophenol, N-methyl-p-anisidine, p-aminoazobenzene, p-nitraniline, sulfanilic acid, the chloroanilines, the dichloroanilines, and 2,4,6-trichloroaniline.

In like manner 3,5,6-trichloro-2-methylbenzoquinone con be made by my process from o- and m-toluidine.

Likewise 2,3-dichloro-1,4-naphthoquinone can be made by my process from naphthionic acid, α-naphthylamine, 4-nitro-1-naphthylamine, and 4-amino-1-naphthol.

This list of compounds demonstrates the versatility and widespread applicability of my process.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method of preparing chlorinated quinones from amino-substituted benzene and alpha-amino-substituted naphthalene compounds which comprises chlorinating the said aromatic compound by passing a gas consisting of elemental chlorine gas into an aqueous acid solution containing said compound, the acid component of said solution being selected from the class consisting of sulfuric acid, and a mix of sulfuric acid with a saturated fatty acid containing from 1 to 4 carbon atoms.

2. A method of preparing chlorinated quinones from amino-substituted benzene and alpha-amino-substituted naphthalene compounds which comprises chlorinating the said aromatic compound by passing a gas consisting of elemental chlorine gas into an aqueous acid solution containing said compound, the acid component of said solution being a mix of sulfuric acid with acetic acid.

3. A method of preparing chlorinated quinones from amino-substituted benzenes which comprises chlorinating the amino-benzene by passing a gas consisting of elemental chlorine gas in an aqueous solution containing the amino-benzene, the acid component of said solution being selected from the class consisting of sulfuric acid in a concentration of from about 40 to about 85 percent by weight, and a mix of sulfuric acid with acetic acid in a concentration by weight ranging from about 45 to about 75 percent of the sum of the two acids.

4. A method of preparing chloranil which comprises chlorinating aniline by passing a gas consisting of elemental chlorine gas into an aqueous acid solution containing the aniline, the acid component of said solution being selected from the class consisting of sulfuric acid, and a mix of sulfuric acid with a saturated fatty acid containing from 1 to 4 carbon atoms.

5. A method of preparing 2,3-dichloro-1,4-naphthoquinone from naphthionic acid which comprises chlorinating the naphthionic acid by passing a gas consisting of elemental chlorine gas into an aqueous acid solution containing the naphthionic acid, the other acid components of said solution being selected from the class consisting of sulfuric acid, and a mix of sulfuric acid with a saturated fatty acid containing from 1 to 4 carbon atoms.

HARRY H. FLETCHER.

REFERENCES CITED

The following references are of record in the file of this patent:

OTHER REFERENCES

Chemical Abst., vol. 25, page 2970 (1931). Abstracting an article by Erdelyi in Chem. Rundschau Mitteleuropa u. Balkan 6, No. 14, pp. 83–4, Datta "Jour. Am. Chem. Soc.," vol. 36, pp. 1011–3 (1914), vol. 45, pp. 480–2 (1923).